Inventors
Joseph A. Ball,
Gerald F. Rackett,
By Roberts, Cushman & Woodbury
Attorneys

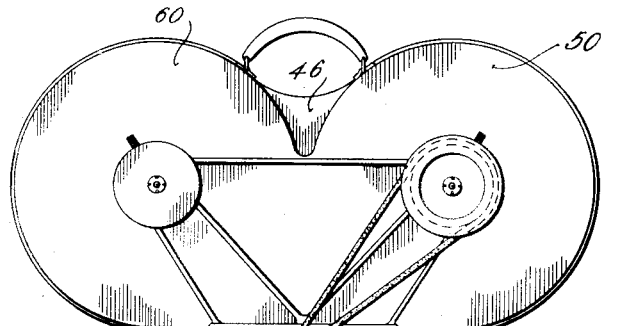
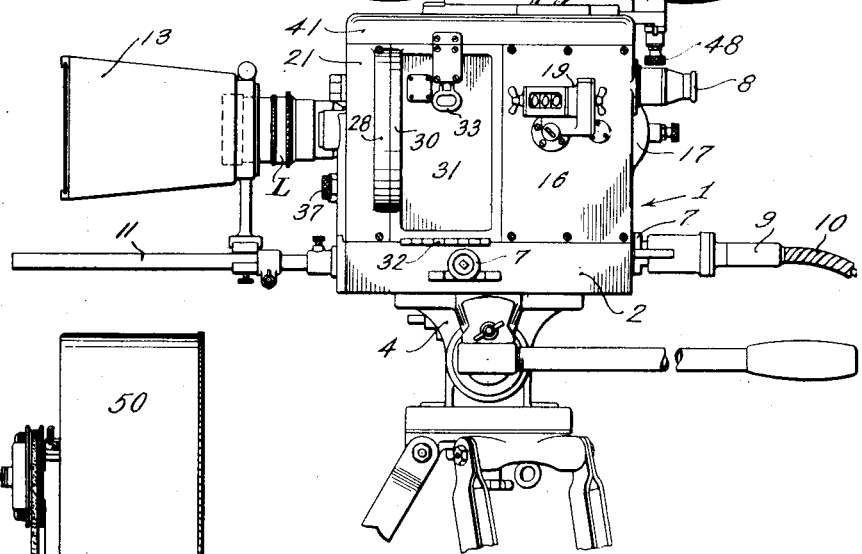
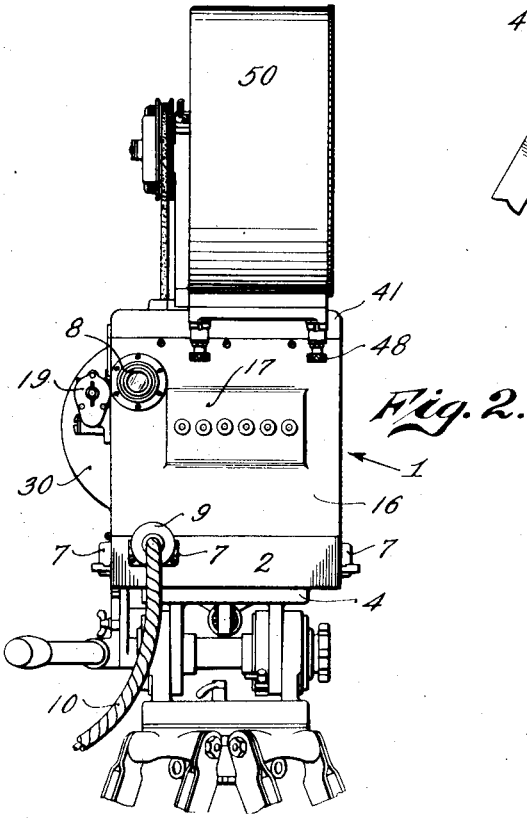
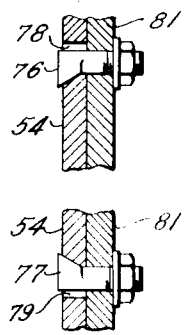

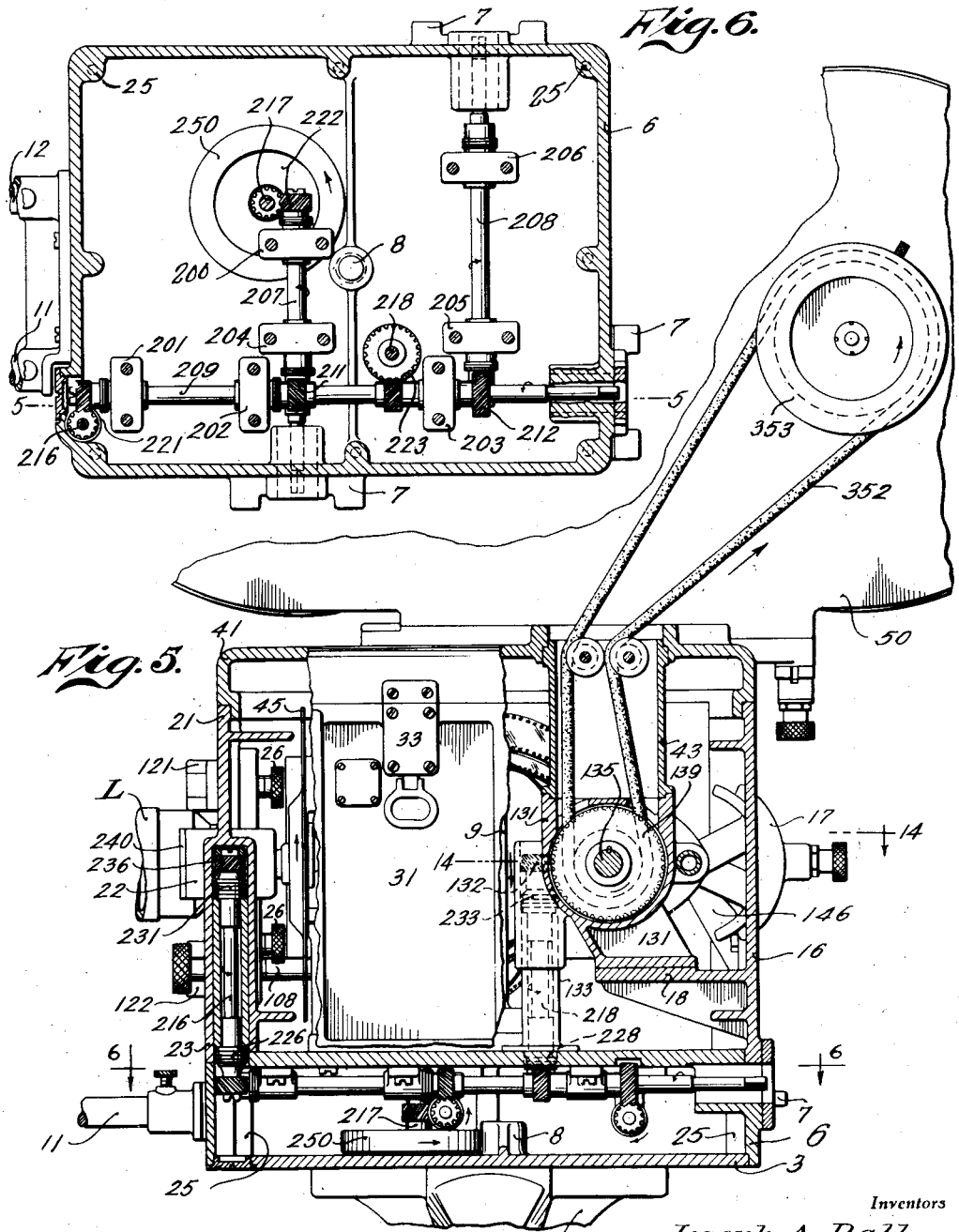

March 2, 1937. J. A. BALL ET AL 2,072,001
CINEMATOGRAPHIC CAMERA
Filed Aug. 20, 1931   10 Sheets-Sheet 5

Inventors,
Joseph A. Ball,
Gerald F. Rackett.
Attys.

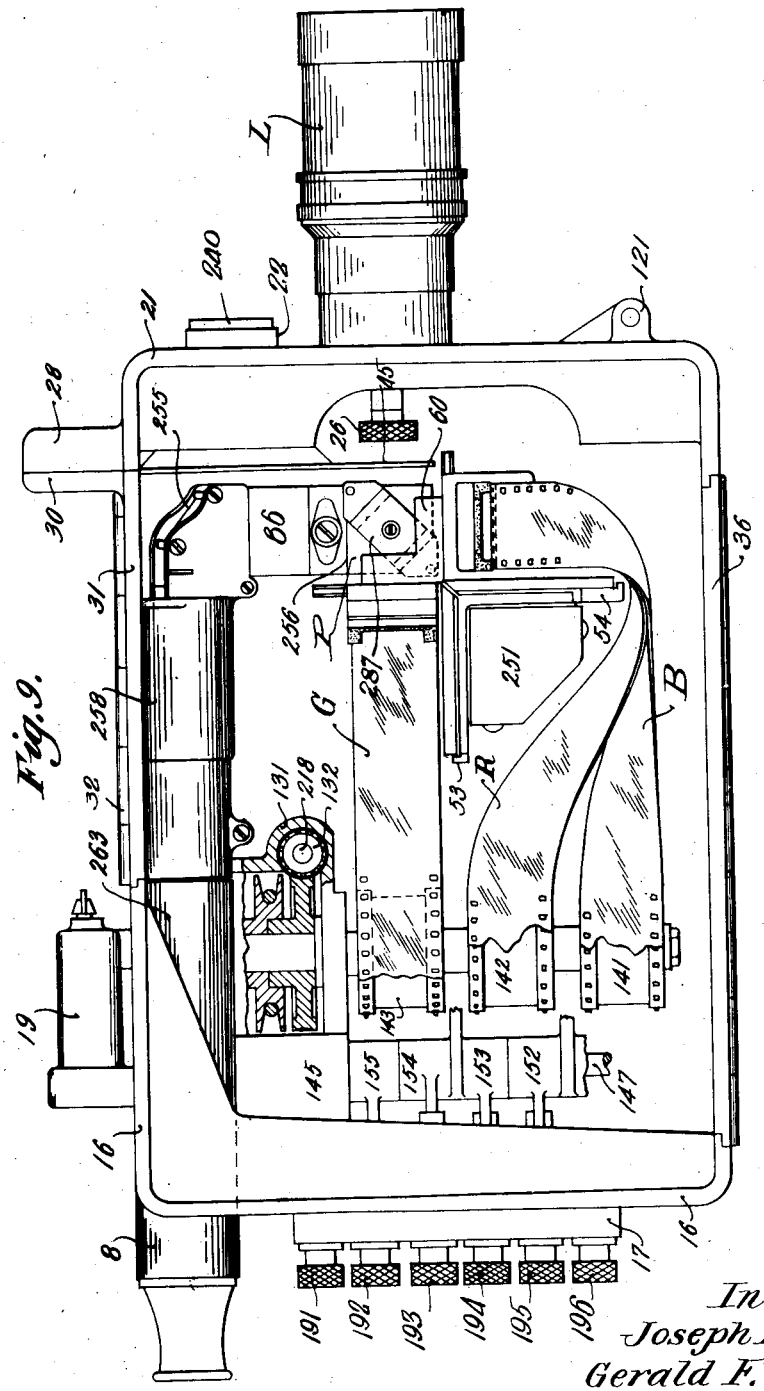

March 2, 1937.  J. A. BALL ET AL  2,072,091
CINEMATOGRAPHIC CAMERA
Filed Aug. 20, 1931  10 Sheets-Sheet 7
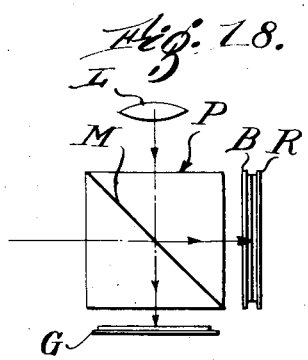
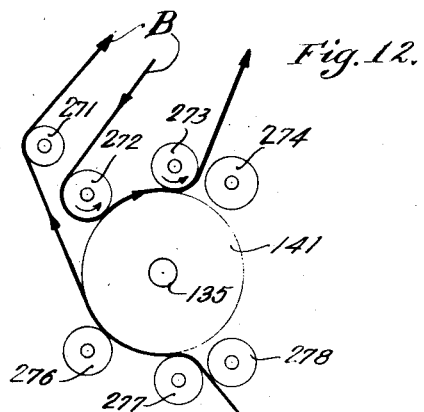
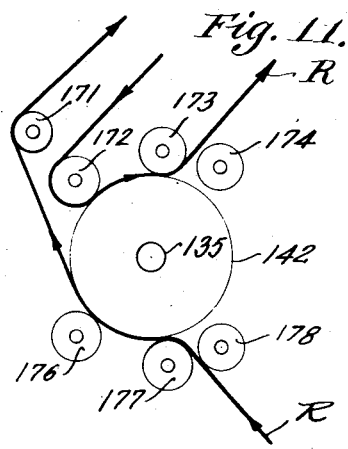
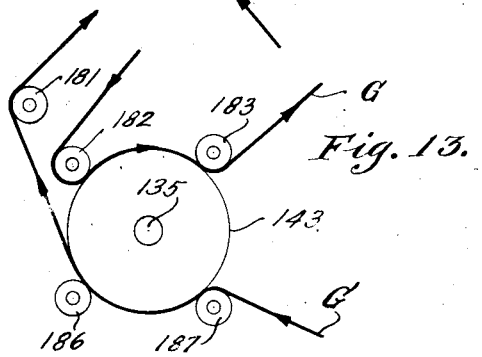
Inventors,
Joseph A. Ball,
Gerald F. Rackett,
by Roberts Cushman & Woodbury
Attys.

March 2, 1937.  J. A. BALL ET AL  2,072,091
CINEMATOGRAPHIC CAMERA
Filed Aug. 20, 1931  10 Sheets-Sheet 8

Inventors
Joseph A. Ball,
Gerald F. Rackett,
By Roberts, Cushman & Woodbury
Attorneys March 2, 1937.  J. A. BALL ET AL  2,072,091
CINEMATOGRAPHIC CAMERA
Filed Aug. 20, 1931    10 Sheets-Sheet 9

Inventors
Joseph A. Ball,
Gerald F. Rackett,
By Roberts, Cushman & Woodbury
Attorneys March 2, 1937. J. A. BALL ET AL 2,072,091
CINEMATOGRAPHIC CAMERA
Filed Aug. 20, 1931    10 Sheets—Sheet 10
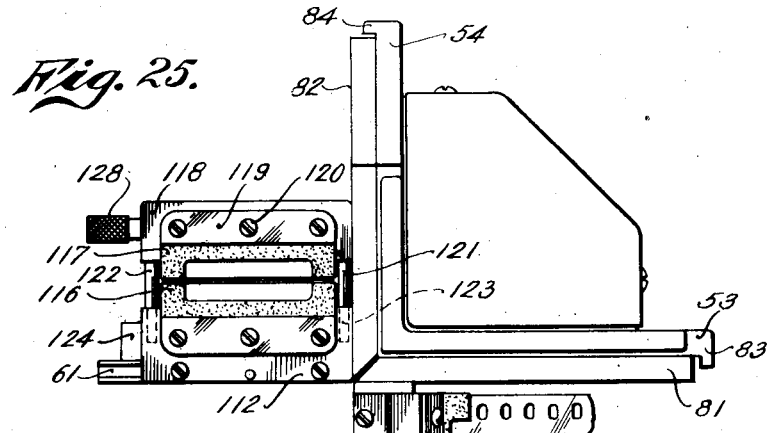
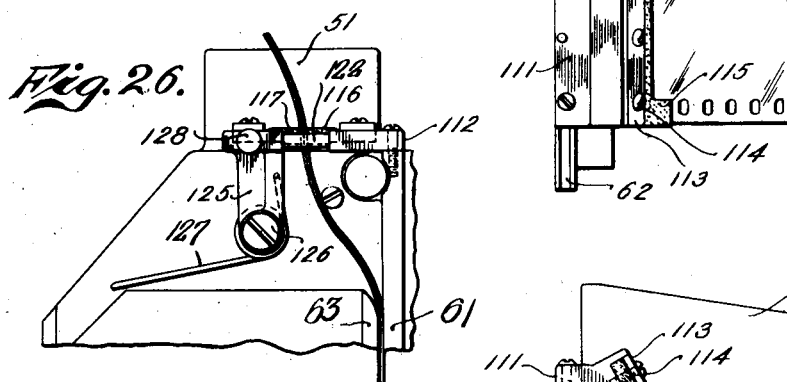
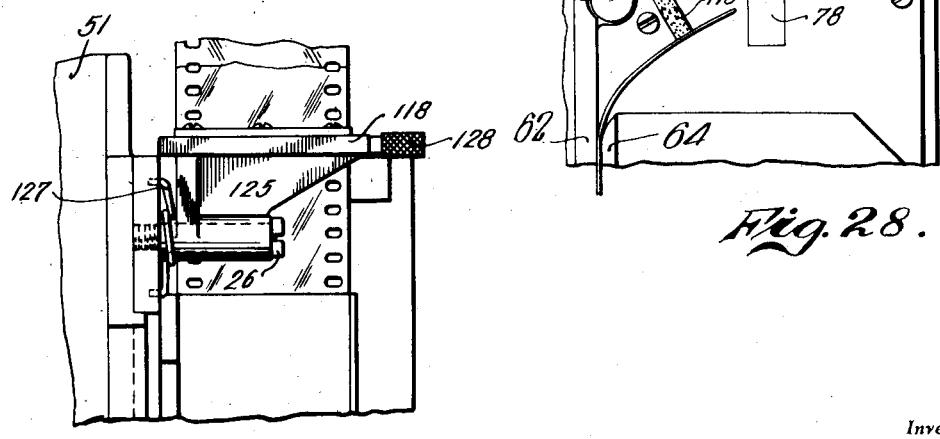
Inventors
Joseph A. Ball,
Gerald F. Rackett,
By Roberts, Cushman & Woodberry
Attorneys Patented Mar. 2, 1937

2,072,091

UNITED STATES PATENT OFFICE 2,072,091

CINEMATOGRAPHIC CAMERA

Joseph A. Ball and Gerald F. Rackett, Los Angeles, Calif., assignors, by mesne assignments, to Technicolor, Inc., New York, N. Y., a corporation of Delaware Application August 20, 1931, Serial No. 558,193

29 Claims. (Cl. 88—16.4)

This invention relates to cameras for making photographs in natural colors, by utilizing a divided light beam or otherwise, and although it is of more general applicability and usefulness for various methods of cinematography and still photography, the invention is particularly adapted and designed for purposes of cinematography in natural colors according to the methods described and claimed in the copending applications of Joseph A. Ball, Serial No. 461,061, filed June 14, 1930, now Patent No. 1,889,030, and Serial No. 545,951, filed June 22, 1931, now Patent No. 2,000,058.

These methods require a camera unit which is in many respects different from the ordinary camera, but which must nevertheless provide the same ease of operation as a standard camera without relinquishing any of the special requirements of the methods of color cinematography referred to above. Accordingly, some of the main objects of this invention are to provide a motion picture camera which handles conveniently and exactly a plurality of films, some or all of which may be superposed at the film aperture or apertures of the camera; to provide an arrangement for feeding a plurality of films from supply reels through a camera of this nature and for again winding them on conveniently arranged take-up reels; to provide an arrangement for such a camera which permits easy threading of a plurality of films and assures steady progress of the films through the camera along short and uncomplicated paths; to provide means for lubricating the films within the camera in order to enhance their progress therethrough; and to provide for precise but simple mounting and adjusting of the various optical elements of the camera which are at the same time conveniently accessible. Further objects are to provide a novel mount for the light-dividing system especially suited for cooperation with the other elements of this camera, means which hold the film-positioning devices and the optical elements in their correct relation to each other, a smooth and equalized drive for the film movements which also permits adjustment of the movements without affecting the drive, an improved gear arrangement for driving the various moving parts of the camera, a novel view finder mount especially suited for purposes of the new camera, and generally to provide a camera for taking motion pictures in natural colors which can be easily and conveniently operated and which permits efficient commercial production of motion picture films under conditions similar to those required for the taking of ordinary motion picture negatives. Additional objects of our invention will be apparent from the following description of a typical concrete embodiment illustrated by drawings, in which:

Figs. 1 and 2 are side and rear elevations of the camera;

Fig. 5 is a section on line 5—5 of Fig. 6;

Fig. 6 is a section on line 6—6 of Fig. 5;

Fig. 7 is a section on line 7—7 of Fig. 3;

Fig. 9 is a top plan with the cover removed and parts broken away;

Figure 14:
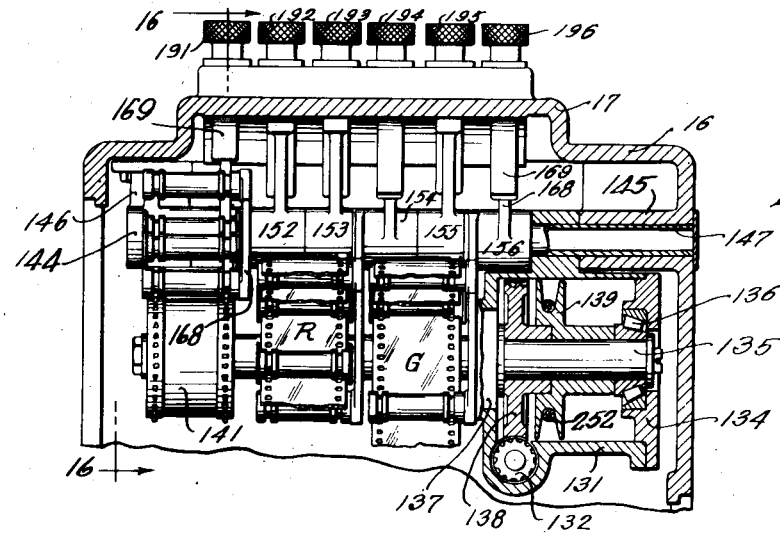
Figure 15:
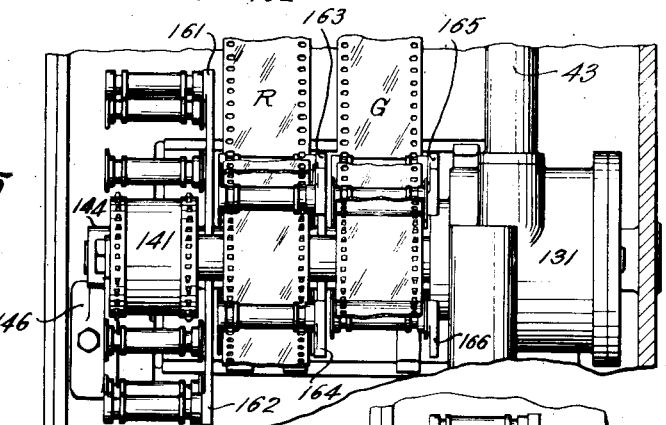
Figure 16:
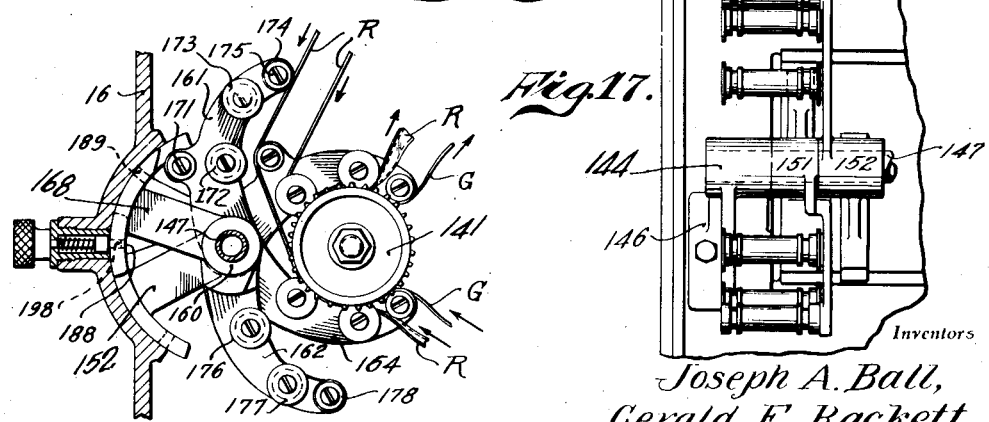
Figure 17:
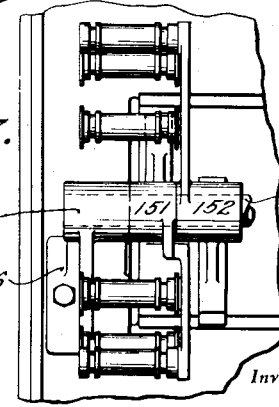
Figure 19:
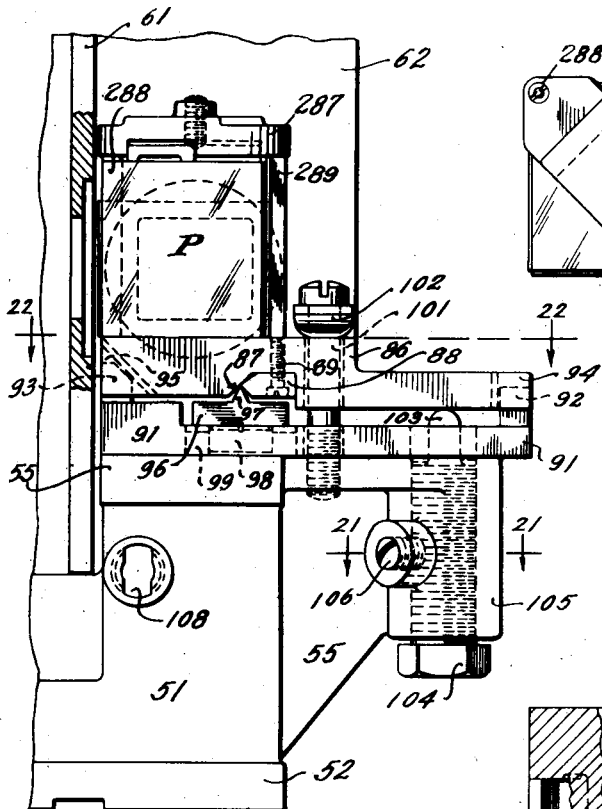
Figure 20:
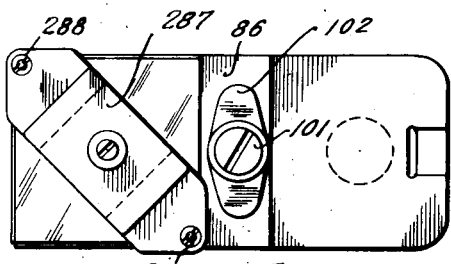
Figure 21:
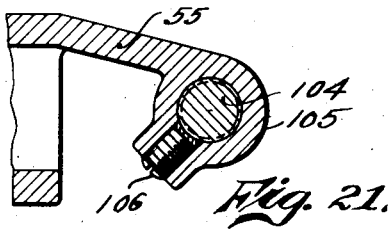
Figure 22:
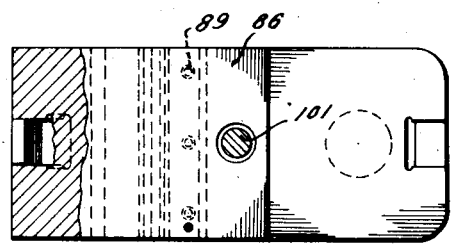
Figure 23:
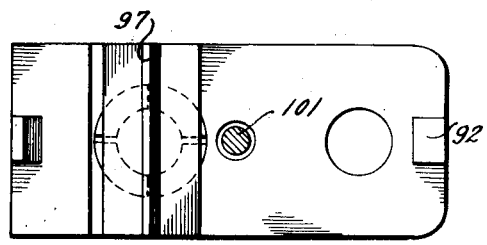
Figure 24:
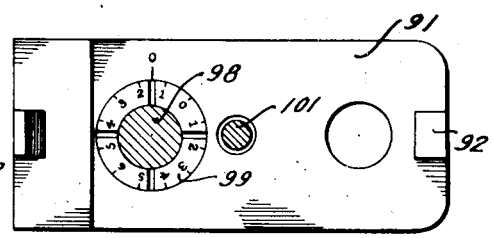

Figs. 11, 12 and 13, respectively, are diagrammatic showings of the manner of threading the films;

Fig. 14 is a section on line 14—14 of Fig. 5;

Fig. 15 is a front elevation of the sprocket mechanism viewed from the bottom of Fig. 14;

Fig. 16 is a section on line 16—16 of Fig. 14;

Fig. 17 is a front elevation similar to Fig. 15 but in the rear of the sprocket wheels;

Fig. 18 is a diagrammatic plan of the prism system;

Fig. 19 is an elevation of the light-dividing prism and its mount viewed from the front;

Fig. 20 is a plan view of the upper part of the prism mount;

Fig. 21 is a section on line 21—21 of Fig. 19;

Fig. 22 is a section on line 22—22 of Fig. 19;

Fig. 23 is a plan view of the lower half of the prism mount with the knife edge in place;

Fig. 24 is similar to Fig. 23, but with the knife edge cut away;

Fig. 25 is a plan view of the central supporting block showing the film lubricating means;

Fig. 26 is a front elevation viewed from the left of Fig. 25;

Fig. 27 is a side elevation viewed from the top of Fig. 25; and

Fig. 28 is a front elevation viewed from the bottom of Fig. 25.

The optical arrangement as described and claimed in the aforementioned applications comprises a lens system L (Fig. 18) and a prism P with a partially reflecting mirror M and two apertures in planes perpendicular to each other for exposing film G and superposed films B and R respectively. The various means and arrangements of the new camera for exposing the films in this manner will now be described, but it is understood that each aperture may contain a plurality of films and that the camera is not limited to the use of two apertures or to the light-dividing system and the particular relative arrangement of apertures and optical elements as herein described.

*General arrangement and housing.*—The various mechanisms of the camera are mounted within a sturdy housing in such a manner that the parts which require accurate positioning with respect to each other are combined in separate units which are structurally capable of maintaining the accuracy of position independently of other units and which are separately accessible and adjustable, whereas parts which do not require particular accuracy of assembly and operation are distributed in other units.

Referring especially to Figs. 1, 2, 3, 4, 5, 6, 9 and 10, the housing 1, which is made of ribbed metal parts (preferably of light weight alloy), is built upon a base 2 comprising a plate 3 and a gear box 6 (Fig. 5). The base plate 3 is conveniently mounted by means of a threaded boss 8 upon a tripod head 4 which has the customary means for rotating and tilting the camera. The gear box 6 has receptacles 7 for the connecting plug 9 of a flexible shaft 10 or other source of power for driving the various movements of the camera. The base plate and gear box are screwed together, threaded bosses 25 being provided for this purpose within the gear box casting. Mounted on the front of gear box are two rods 11 and 12 supporting a hood 13 which shades the lens systems and has provisions for attaching filters, screens, etc. (Figs. 1 and 6). Inside the gear box is mounted a power distributing device with various gears and a flywheel which will later be described in detail; and on top of the gear box is mounted the central supporting block 51 for the light splitting system and the film movements, and the sprocket drive shaft housing 133 (Figs. 4 and 5), both also to be described later. Mounted upon the gear box 6 is a rear wall 16 which also covers a part of each of the longer sides of the camera as shown in Fig. 9. The rear wall 16 has a cylindrical bulge 17 for the sprocket roller mechanism (to be described later), brackets 18 and 146 (Figs. 4 and 5) and a hollow extension 145 (Fig. 14) for supporting the sprocket roller mechanism (to be described later), and also provisions for mounting a tube 263 for the eyepiece 8 of a view finder. On one side portion of the rear wall is a footage indicator 19 (Fig. 1) of usual design which is suitably coupled to the sprocket drive.

The front wall 21 forms a housing 22 (Fig. 3) for the shutter shaft and another housing 23 (Fig. 5) for the shutter drive shaft. The front wall also supports the front door 24 (Fig. 4) by means of hinges 121 and 122 (Figs. 5 and 9) to which the lens system L is fastened by means of clamp screws 26. The front door 24 has a lock 37 in a boss 38, this lock cooperating with boss 108 of the main supporting block to hold the lens system on the closed door in adjusted position relative to the light-dividing prism inside the casing. The front wall also forms one-half 28 (Figs. 1, 9 and 10) of a shutter housing, the other half 30 thereof being part of a side door 31 which has horizontal hinges 32 and a lock 33 and which supports part of the view finder later to be described. The side door closes the space between front wall and the side extension of the back wall as shown in Figs. 1 and 9. The fourth side of the camera is closed by a side door 36 (Figs. 9 and 10) which provides access to the other side of the camera.

The top plate 41 (Fig. 3), which rests on the side walls to which it is screwed, as indicated at 40, has mounted thereon a bracket 42 which supports a film guiding roller 106 and also the magazine 46 itself by means of a ledge 47 and screws 48. The magazine has a light seal 49 with three rollers 251, 252, 253 (Fig. 3), and preferably incorporates a frictional drive for the three spools supported on shaft 158.

Figure 3:
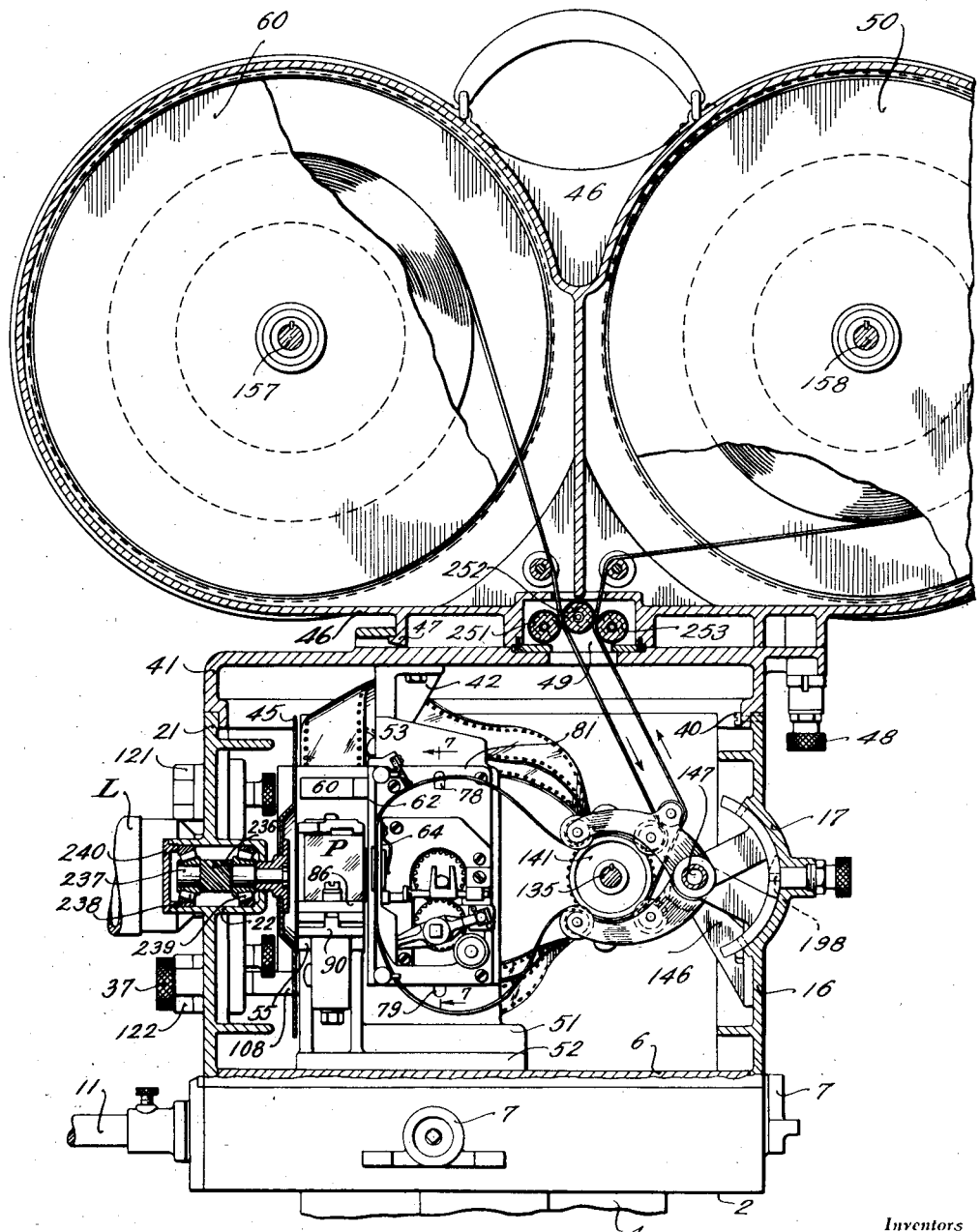
Figs. 3 and 4 are vertical longitudinal sections viewed from the left and right of the camera respectively.
Figure 4:
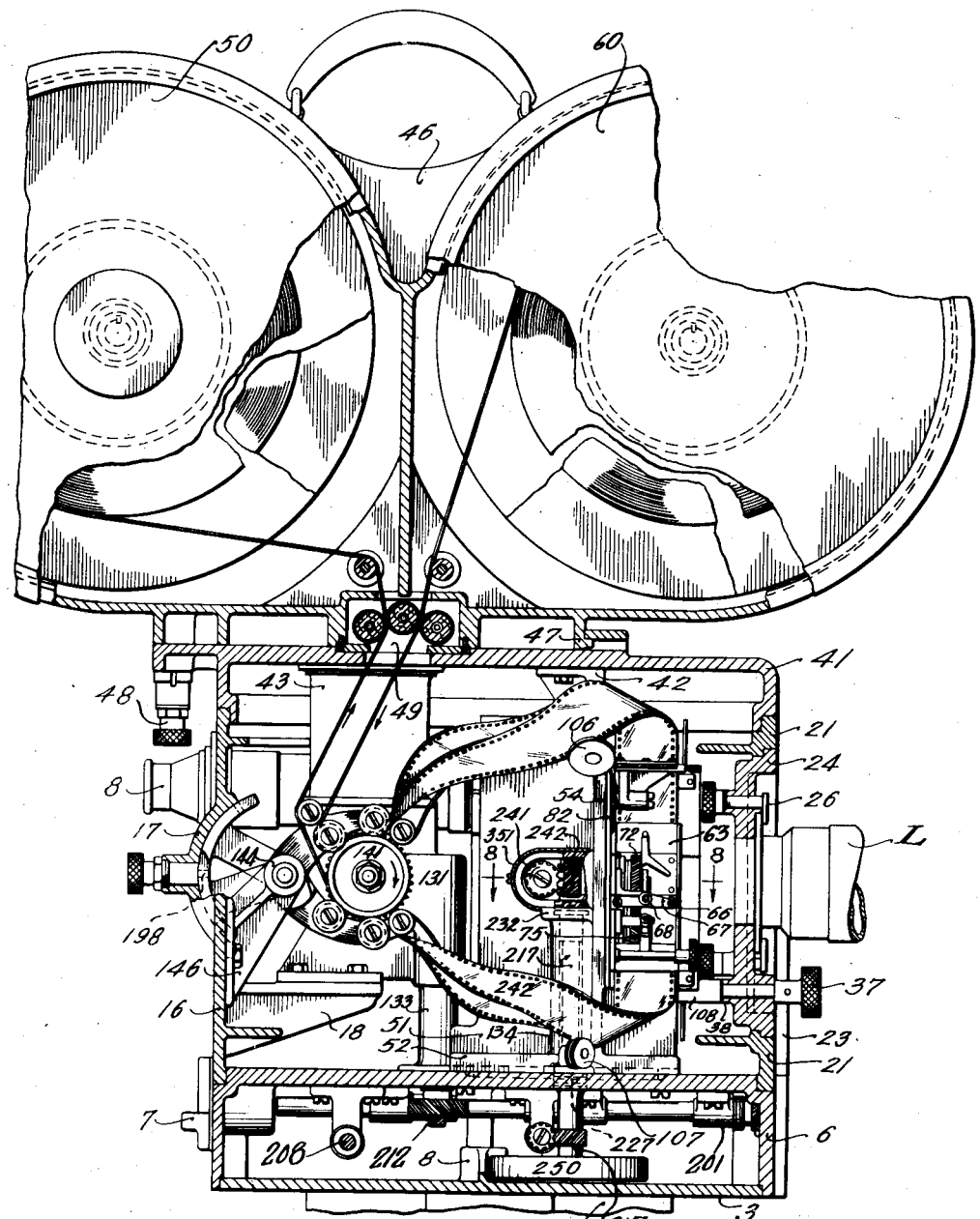
Figure 10:
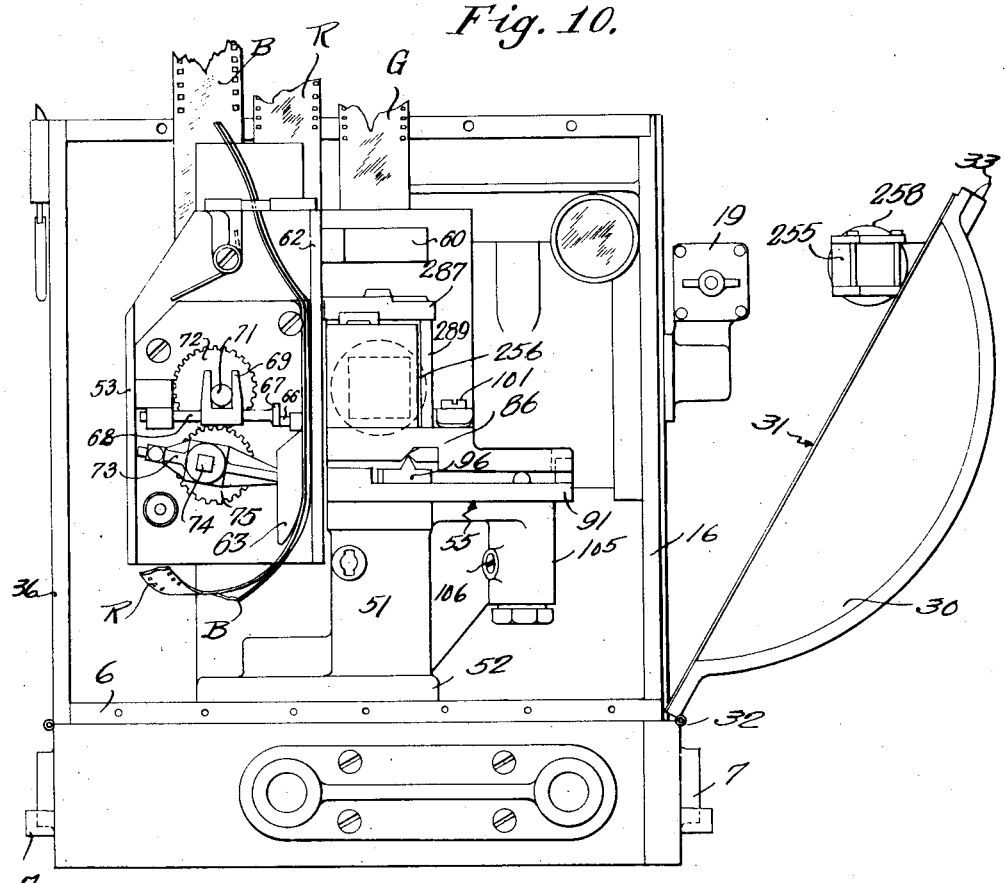
Fig. 10 is a front elevation of the camera with the front wall removed.
Figure 8:
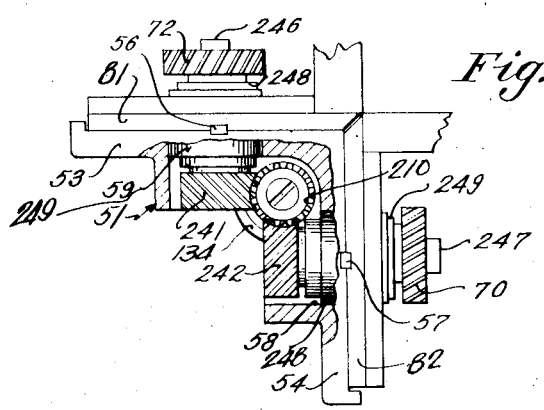
Fig. 8 is a section on line 8—8 of Fig. 4.

*Central supporting block.*—The block 51 (Figs. 3, 4, 8, 9, 10, 19 and 21), which supports the light-dividing prism system and the two film movements of the camera, is screwed directly to gear box 6 through foot 52. With the foot 52 and the two flanges 53 and 54 the block 51 has a main cross-section in the shape of an L, and the housing 134 for the drive shaft 218 is provided in the angle of this L-shaped support (Figs. 4 and 8). The block 51 also has a prism bracket 55 (Figs. 10 and 19). The mutually perpendicular machined faces of flanges 53 and 54 and of bracket 55 correspond to the faces of the prism unit, the flange faces forming an angle of 270°, and the bracket face forming 90° angles with each flange face. The flanges 53 and 54 have vertical key ways 56 and 57 in their faces for positioning and adjusting the film movements, and also openings 58 and 59 (Fig. 8) for the bearings 248 and 249 of the film movement drive shafts hereinafter described. Each movement has an aperture plate 61 and 62 (Figs. 3 and 25) respectively and back plates 63 and 64 (Figs. 3 and 4) respectively between which the films are guided. The film feeding device proper (Figs. 3, 4, and 10) comprises registering pins 66 mounted on a yoke 67 and a rod 68 with fork 69, the registering pins being reciprocated perpendicularly to the aperture plane by means of cam 71 which is eccentrically mounted upon gear 72. The movement further comprises feeding pins 73 driven by cam 74 of gear 75 which meshes with gear 72. This film movement is of known design, may be replaced by any other suitable movement, and need therefore not be described in detail herein. The back plates 63 and 64 are integral with aperture flanges 81 and 82 (Figs. 8, 25 and 26), with which they form angular pieces, the flanges being slidably fastened to the block flanges 53 and 54. It will be evident that the aperture plates 61 and 62 form angles of 90° with each other and the bracket face, and that the optical axes of the light dividing prism P, mounted on bracket 91, will be substantially perpendicular to the respective aperture plates, as will be described more in detail hereinafter. With the aid of keys in key ways 56 and 57 the movements can be adjusted in vertical direction without becoming subject to rotation about the axis of their shafts, and by shimming them away from their supporting faces they can also be adjusted perpendicular to these faces. For adjusting the relative positions of the movements on the central supporting block two screw wedges 76 and 77 (Fig. 7) are arranged to engage the wedged perforations 78 and 79 of flanges 53 and 54. By appropriately adjusting these wedge screws the entire movements can be slightly moved in vertical direction with respect to block flanges 53 and 54. After proper adjustment aperture plates 61 and 62 can be braced, dowelled, and fastened together with a strong aperture plate bracket 60 (Figs. 3, 9 and 10).

The light-dividing and selecting system P (Figs.

3, 9, 10, 18 and 19) is preferably arranged as described in the above-identified copending applications of Joseph A. Ball, and its optical characteristics need not therefore be described in detail herein. As shown in Figs. 19 and 20 the prism system is clamped to a steel plate 86 by means of a yoke 287 and screws 288 and 289. The steel plate 86 has a recess in which a knife-edge 88 is held in place by screws 89, the recess and knife-edge together forming a precisely straight groove 87. A base plate 91 rests upon prism bracket 55 and has two bosses 92 and 93 which fit snugly into slots 94 and 95 of steel plate 86, thereby confining the relative motion of prism mount and base plate within a plane perpendicular to groove 87. Base plate 91 is fixed to bracket 55 after the bosses 92 and 93 are placed perpendicular to the plane of aperture 61 and parallel to the plane of aperture 62. The groove 87 receives a knife 96 with an edge 97, knife 96 having a round extension 98 which rests rotatably in an eccentric bushing 99 confined in base plate 91. Accordingly the prism mount can rotate about a horizontal axis defined by the knife-edge 97 and the bosses 92, 93 and slots 94, 95. For final adjustment, it can also be transposed laterally by means of the eccentric bushing which may have graduations (as shown in Fig. 24) indicating the degree of lateral movement. Steel plate 86 is pressed towards the ball point 103 of a micrometer screw 104 by screw 101 and flat spring 102, the micrometer screw being supported in boss 105 of bracket 55 and locked by screw 106. By adjusting screw 104 the prism mount can be rotated about edge 97. The central supporting block also has a threaded boss 108 which cooperates with boss 38 and lock screw 37 of the lens door 24. Both bosses have exactly machined faces which, with the door in closed position, are pressed together by the lock screw engaging the threads in boss 108, so that the prism and lens systems are exactly spaced when the door is locked. In order not to interfere with the function of the spacing bosses the door does not close snugly against its jamb. This arrangement insures that even though the front wall of the camera may flex and distort slightly, the distance from film to lens or focus setting can not be affected. Furthermore the lens door hinges 121 and 122 are placed as far as possible away from the optical axis of the lens system so that the direction of the axis will only shift to a negligibly small degree if the front wall should flex.

This arrangement of lens mount and central supporting block with aperture mounts and prism mount permits adjustment of the relative position of lens, prism and apertures in the following manner. The aperture plates 61 and 62 determine, with back plates 63 and 64, the planes of the recording surfaces and the registering pins 66 position the recording surfaces definitely within their planes by engaging the film perforations, so that aperture plates and registering pins together fully determine the position of the picture frames. In order to coordinate the two aperture planes with the optical planes of the images as produced by lens and prism, it is preferable first to fix the relative positions of the aperture rectangles or picture frames by positioning the four registering pins in a single plane transverse to the supporting block flanges, and at equal distances from the line of intersection of the two aperture planes. This is accomplished by slightly moving the aperture flanges longitudinally along key ways 56 and 57 of the supporting block, in order to bring the registering pins in the same plane, and by slightly shimming them in order to equalize their distances from the intersection line of the aperture planes. It is possible to make these adjustments without affecting the mesh of the driving gear because of the peculiar design of the driving gear of the film movements which will later be described. After the aperture planes and the picture frames within these planes are correctly positioned the light splitting prism can be fixed in its proper position relative to the apertures by adjusting the knife-edge 97 and ball point 103. In this manner the prism can be very accurately shifted into optical alignment and register with the film positioning members and the lens system, and then held accurately and permanently in that position. Furthermore the prism can be removed for cleaning or other purposes and repositioned, without in any way disturbing its correct position, merely by loosening screw 101 and, upon returning, engaging its slots 94 and 95 with registering bosses 92 and 93 until it rests on knife-edge 97 (which is free to rotate about extension 98 into alignment with the groove) and ball point 103, whereupon it is again fastened with screw 101. In this manner, the prism mount proper is secured in place merely by faces 92 and 93, knife-edge 97 and ball point 103, these elements being sufficient positively to determine the spatial position of the mount, without introducing uncontrolled stresses, since they form a statically determinate system.

*Film oiling device.*—The aperture plates 61 and 62 support oiling devices which consist substantially of felt pads arranged to touch the films slightly along their perforated margins and apply a slight amount of oil to them as they enter the movements. Such oiling devices are practically indispensable with apparatus of the kind described and are shown separately in Figs. 25, 26, 27 and 28. Pad holders 111 and 112 (Figs. 26 and 28) are secured to the aperture plates respectively, the holders, with the aid of clamping plates 113 and screws 114, supporting U-shaped felt pads 115 and 116. The aperture containing superposed films requires two oil pads, one for each film, and has therefore in addition an outer pad holder 118 with pad 117 fastened thereto by means of clamp plate 119 and screws 120 (Figs. 25 and 26). The outside pad holder has an arm 125 journaled on screw pin 126 and forced towards the film by spring 127. It can be swung away from the films by means of handle 128 and its proper distance from the film is maintained with the aid of two positioning pins 121 and 122 which screw into holder 112 at 123 and 124 and whose length can be adjusted according to requirements.

*Feed and take-up sprockets.*—Referring especially to Figs. 5, 9, 11, 12, 13, 14, 15, 16 and 17, bracket 18 on rear wall 16 of the camera housing, supports a sprocket gear housing 131. This housing encloses the spiral gear 132 which is mounted on shaft 218 ascending from the power distribution gear and protected at its lower part by shaft housing 133 (Fig. 5) screwed to gear box 6. Housing 131, together with bearing plate 134 (Fig. 14) also supports sprocket shaft 135 (Figs. 3 and 14) by means of two tapered roller bearings 136 and 137. Within the housing 131 a gear wheel 138, which meshes with spiral gear 132, is fixed to shaft 135. A pulley 139 for the belt drive of the take-up spools is also fixed to shaft 135. This belt drive is made light tight by housing 43 (Fig. 5). Keyed to shaft 135 are three sprockets 141, 142 and 143. Housing 131 and tubular extension 145 of rear wall 16 (Fig. 14) support, together with bracket 146 and its boss 144, a tube 147 upon which scissor units 151, 152, 153, 154, 155 and 156 are rotatably mounted. Each scissor unit has a hub 160 (Figs. 16 and 17), a roller arm 161, a segment arm 168 and a segment 169 (Fig. 14). Two adjacent units cooperate like the blades of a scissors, swinging with their hubs on tube 147, the hubs of two cooperating scissor units being at opposite sides of the arms, with the roller arms intermediate thereof, and the segment arms attached at about the middle of the hubs. Each of the roller arms 161 and 163 (Fig. 15), which are the upper arms belonging to sprockets 141 and 142, supports, by means of pins 175, four rollers 171, 172, 173, 174 and 271, 272, 273, 274, respectively, rollers 172, 173 and 272, 273, respectively, having the purpose of holding the film against the sprockets, whereas rollers 171, 271 and 174, 274, respectively, support the films as they leave the sprockets, as will later be described in detail. The lower roller arms 162 and 164 have only three rollers 176, 177, 178 and 276, 277, 278, respectively, arranged like upper rollers 172, 173, 174, 272, 273 and 274. The upper roller arm 165 belonging to sprocket 143 has only three rollers 181, 182 and 183 corresponding to rollers 171, 172 and 173 of the upper roller arm 161. Lower roller arm 166 which cooperates with upper roller arm 165 has two rollers 186 and 187 arranged similar to rollers 176 and 177 of roller arm 162.

The segments 169 fit with their circular fronts into the bulge 17 of rear wall 16 of the camera, and each segment has two perforations 188, 189 which are adapted to receive pins 198 of six control knobs 191, 192, 193, 194, 195 and 196, one for each segment. Holes 188 correspond to the open or film releasing position of the roller arms, and perforations 189 to the closed or film engaging position thereof. By pulling back a control knob, the corresponding pin releases the perforations which it engaged, the segment and the roller arm can be rotated and the latter again arrested in its second position by releasing the control knob. The operation of the sprocket device, in cooperation with the films and the apertures, will be described hereinafter.

The film loop between aperture plate 61 and sprockets 141 and 142 is furthermore supported by two guide rollers 106 and 107 (Fig. 4), roller 106 being carried by the top of gear box 6 and roller 107 by bracket 42 of the housing top.

*Driving gear.*—The camera comprises three different power driven units, namely, the aperture unit with two film feeding movements, the film sprocket and take-up spool drive, and the shutter drive. In order to make the various drives properly accessible and easily and independently adjustable, a power distribution gear is arranged in gear box 6 (described hereinbefore), and the three units are independently driven by three shafts vertically ascending therefrom. The distribution gear comprises bearings 200, 201, 202, 203, 204, 205 and 206 (Fig. 6) attached to the top of the gear box and three shafts 207, 208, 209. Shafts 208 and 209 are connected with shaft 207 by spiral gears 211 and 212. Each of these three shafts 207, 208 and 209 has a square end for coupling it with a flexible shaft or other driving device by means of receptacles 7 (as described before), which permits power supply from either side and from the back of the camera. Vertical shafts 216, 217 and 218 are driven from shafts 207 and 209 by means of spiral gears 221, 222 and 223. The shafts 216, 217 and 218 respectively, are supported by thrust bearings 226, 227, 228, 231, 232, 233 (Figs. 4 and 5) and run in oil-tight housings 23, 133 and 134, as described hereinbefore. The shutter drive shaft 216 drives a shutter shaft 237 over spiral gear 236, supported in housing 22 of front wall 21 by two tapered roller bearings 238 and 239, and accessible through cover screw 240 (Fig. 3). A shutter 45 of conventional design is mounted on an extension of shaft 237 which protrudes beyond the housing 22. The shutter rotates between lens system L and prism system P, partly in the housing formed by the halves 28 and 30 of front wall and side door respectively, as described before.

In order to assure harmonious operation of the two film movements they are both driven from shaft 217 over a single spiral gear wheel 210 meshing with two gear wheels 241 and 242 (Fig. 8). Shaft 217 runs in housing 134 of the main supporting block 51 in thrust bearings 227 and 232. Gear wheels 241 and 242 drive the two short film movement shafts 246 and 247 (Fig. 8) which are supported in aperture flanges 81 and 82 by means of bearings 248 and 249. As described before, the aperture flanges 81 and 82, mounted on block flanges 53 and 54, are adjustable transversely and longitudinally of the block flanges and this adjustment is made possible by the peculiar arrangement of gears 210, 241, and 242 whose mesh is not affected by such adjustments. Although the timing of the movements is very slightly effected thereby, the adjustment amounts ordinarily to only a few thousandths of an inch and its effect on timing is therefore negligible. These gears are enclosed in a cover 351 in the angle between the two main block flanges (Fig. 4). The film movement gear wheels 70 and 72 are fixed to the other ends of shafts 247 and 246 respectively, and drive the registering and advancing pins, as described hereinbefore. Since the movements are intermittent in their action they require an intermittent flow of power supply which must be equalized by rotating masses. In order to prevent undesirable interferences between separate flywheels for each movement, a single flywheel 250 is employed according to the present invention. Since it is mounted on shaft 217, either within the gear box as shown in Fig. 5 or elsewhere, it acts upon both movements driven from the same shaft.

The sprocket drive shaft 218 supported by thrust bearings 228 and 233 runs within housings 133 and 131 and drives the gear wheel 138 (Fig. 14) on shaft 135 by means of spiral gear 132. From pulley 139, also fastened to the sprocket shaft 135, a belt drive 352 leads through housing 43 (Fig. 5) to pulley 353 of the take-up spool gear which again drives in appropriate manner the three take-up spools for the three films which are mounted on a shaft (or on concentrical or parallel shafts) parallel to the sprocket shaft 135.

*View finder.*—A view finder whose optical arrangement is not a subject matter of the present patent application, comprises substantially a mirror 255 opposite face 256 of the prism P (Figs. 9 and 10), face 256 not being obstructed by any of the elements of the camera, and an eyepiece 8. The mirror 255 is supported at the end of the tube 258 mounted on the side door 31. The eyepiece 8 is mounted in tube 263 which is secured to and penetrates back wall 16. This arrangement has the advantage of making the prism P and the central supporting block easily accessible through side door 31, and it also permits convenient cleaning of the finder mirror 255.

*Operation.*—The adjustment of the optical elements, namely, lens system, prism system, and apertures, in their proper relative position has been explained before to some extent, but will now be described as a whole. The lens system L is secured in lens door 24 by clamp screws 26 and maintained at the proper distance from the prism system P by means of bosses 38 and 108 of door and main supporting block, respectively, and by screw lock 37. This arrangement permits access to the lens system as well as to the front part of the camera by opening door 24, without disturbing the initial relative adjustment of these two systems upon subsequent closing of the door. Permanent adjustment of the prism system relative to the lens system and apertures is accomplished by properly and accurately machining the faces of bracket 55, base plate 91, knives 97 and 88, steel plate 86, slots 94 and 95, and bosses 92 and 93, and by setting ball point 103. The apertures are positioned by vertically shifting the aperture flanges 81 and 82 and key ways 56 and 57 and by shimming them perpendicular to the faces of flanges 53 and 54. The various positioning movements are so arranged as to allow relative motion of the optical elements in straight paths along the three mutually perpendicular dimensions and rotation about three axes coinciding with the directions of the dimensions; in other words, adjustment takes place by transverse motion along the three axes of a three dimensional rectangular reference system and rotation about these three axes. Furthermore, the prism system can be removed for cleaning or other purposes and again replaced exactly into the former position by means of screw 101, knife-edge 97, ball point 103, and bosses and slots 92, 93, 94, 95, defining a statically determinate system, as described hereinbefore.

With the optical elements properly positioned, it will hardly be necessary ever to readjust them because both aperture and prism systems are arranged upon the rigid main supporting block 51, and because of the lens door construction.

In order to thread the films, three film spools are inserted in magazine 60 on a shaft 157 (Fig. 3) which is substantially parallel to sprocket shaft 141, the ends of the films being secured to three take-up spools similarly arranged on shaft 158. The films are threaded between rollers 251, 252 and 253 of the light seal 49 so that the three film loops are now arranged parallel side by side. Assuming that the films are to be exposed as described before with reference to Fig. 18, the film B bearing the blue recording emulsion comes from sprocket 141 next to side door 36, the film R with the red recording emulsion is in the center coming from sprocket roll 142 and the green recording film G is next to the sprocket drive coming from sprocket roll 143. The films are wound upon their spools in such a manner that the emulsions of films B and G face roller 251, whereas the emulsion of film R faces roller 252. The scissor units are opened and kept in this position by knobs 191 to 196, which, during the threading operation, are consecutively moved into closed position where they are again arrested by the knob pins and segments. The films are threaded in the following manner. Each film is first inserted between rollers 171 and 172, 271 and 272, respectively, and 181 and 182, respectively (Figs. 11, 12, 13), and films B and R, after the sprocket pins are inserted into the film perforations, are brought out again between rollers 173 and 174 and 273 and 274, respectively, (Figs. 11 and 12). Film G emerges between sprocket roll 143 and roller 183 (Fig. 13). Films B and R are now turned a quarter turn longitudinally, and a half turn laterally towards aperture plate 61 (Figs. 4 and 9), whereby the two films are superposed so that they form a single loop, and they are now threaded into the film gate, the two emulsions being in contact, with the blue sensitive film nearest to prism P, as shown in Fig. 18. Upon emerging from the film gate, the two superposed films B and R are again separated and returned to their sprocket wheels with loops converse of those between the upper rolls and the film gate. The loops are supported by guide rolls 106 and 107 (Fig. 4). The films B and R are now introduced between rollers 177 and 178 and 277 and 278, respectively, their perforations engaged at the lower side of the sprocket rollers 141 and 142, where they are secured by rollers 176 and 177 and 276 and 277, respectively, and brought out over the upper side of rollers 171 and 271, respectively. As described before, the emerging films are threaded between rollers 252 and 253 of the light seal and are ready to be wound upon the three take-up spools in magazine 56, which are arranged on a shaft 158 similar to the spools in magazine 60 and driven from pulley 353.

Threading over the sprocket wheels can be conveniently accomplished through the opened side door 36 and the apertures are easily accessible through lens door 24 and side door 31. This arrangement permits placing the triple unit magazines with their long dimension parallel to the optical axis of the camera, which results in a ratio between length and width of the camera which is desirable in any device which is pointed toward an object. This design also affords a spatial arrangement of the films which permits them to be housed in a box of desirable rectangular proportions and smaller content than could otherwise be obtained, thus eliminating undesirable weight and avoiding clumsily dimensioned apparatus.

It should be understood that the present disclosure is for the purpose of illustration only and that this invention includes all modifications and equivalents which fall within the scope of the appended claims.

We claim:

1. A mount for an optical system comprising means mechanically defining an axis substantially parallel to an optical axis of said system, means for laterally adjusting said axis, means for rigidly positioning said optical system with reference to said axis excepting for rotation thereabout, and separate means for adjustably positioning said system with respect to said rotation.

2. In a device of the character described, a mount carrying an optical system, means for rigidly supporting said mount excepting for rotation about two axes and progress in one of said two axes, means restraining motion along said one of said two axes and rotation about the other of said two axes, and means restraining the remaining rotatory motion, said mount and said optical system forming a statically determinate system and said axes being substantially parallel to optical axes of said system.

3. In a device of the character described, an optical unit comprising a support, a light divider on said support having a surface for dividing an incident light beam into two component beams one of which is at an angle to the incident beam, a film gate for each beam, and means for adjustably mounting said unit, said mounting means comprising a pivot co-directional with one of said beams and means to rotate the support on the pivot to adjust the other beam relatively to its gate.

4. In a device of the character described, an optical unit comprising a support, a light divider on said support having a surface for dividing an incident light beam into two component beams one of which is at an angle to the incident beam, a film gate for each beam, and means for adjustably mounting said unit, said mounting means comprising a pivot co-directional with one of said beams and an adjustable stop for said support to rotate the support on the pivot for adjusting the other beam relatively to its gate.

5. In a device of the character described, an optical unit comprising a support, a light divider on said support having a surface for dividing an incident light beam into two component beams one of which is at an angle to the incident beam, a film gate for each beam, and means for adjustably mounting said unit, said mounting means comprising a pivot co-directional with the undiverted beam and means to rotate the support on the pivot to adjust the diverted beam relatively to its gate.

6. In a device of the character described, an optical system mounted on a base plate having a linear groove, a support plate, a knife-edge freely rotatable about an axis substantially perpendicular to said support plate and engaging said groove, an adjustable point support for said base plate, and means confining the relative motion of base plate and support plate to a plane substantially perpendicular to said groove.

7. In a device of the character described an optical system mounted on a plate, a support plate, a knife edge on one of said plates freely engaging a linear groove on the other one of said plates, said knife edge being rotatable with respect to its plate about an axis substantially perpendicular to the edge, an adjustable free point contact between said two plates, and means for retaining said plates in contact through said groove, said edge and said point.

8. A motion picture machine comprising means for supplying three films, two film gates, three substantially coaxial sprocket means receiving said films from said supply means side by side substantially in a single plane, feeding two films to one of said gates which receives said two films in superposition and the third film to the other gate, and receiving them again from said gates side by side in a single plane, said films forming loops between the two film receiving portions of each of said sprocket means.

9. A motion picture machine comprising a light dividing system for providing two component light beams at an angle to each other, three film reels each supplying a film strip, a film gate in each light beam, means for feeding the three films to and from the gates, means between the gates and the feeding means for superimposing two of the films, means beyond the gates for separating the films and guiding them separately to the feeding means and three reels for taking up the films separately.

10. A motion picture camera of the character described comprising means for rotatably and coaxially supporting two film reels each supplying a film strip, a film gate at an angle to the axis of said reels, means for transporting in unison said film strips toward said gate, and means between the transport means and the film gate for superimposing the two films.

11. In a motion picture machine of the character described, means for providing component light beams at an angle to each other, a group of three reels supplying film strips, a group of three film sprockets, two film gates substantially perpendicular to the directions of said beams, means between the gates and the sprockets for superimposing two film strips supplied from different reels by two different sprockets in one of said gates, and means for guiding the film strip supplied from the third reel by the third sprocket through the other gate.

12. In a device of the character described, a central supporting block having two faces forming a reflex dihedral angle and two film gates, each gate comprising a film aperture plate and a support flange at an angle thereto, means to secure the support flanges to said faces with the aperture flanges extending within the reflex angle betweeen said faces, and light dividing means between said aperture plates directing light to said film gates.

13. A photographic camera comprising a central supporting block having a prism bracket, a light-dividing prism mounted on a base plate having a linear groove, a support plate resting on said bracket and having associated therewith a linear knife-edge engaging said groove and rotatable about an axis substantially perpendicular to said support plate, means supporting said base plate at a point which is adjustable substantially perpendicular to said plates and means confining the relative movement of said plates to a plane substantially perpendicular to said knife-edge.

14. A camera comprising a supporting block having three mutually perpendicular faces, two of which face the third and have parallel key ways substantially perpendicular to said third face, film gates mounted upon said two faces and adjustable along said key ways, and a light-splitting device mounted on said third face.

15. A motion picture camera comprising a rigid supporting block having three faces, two faces forming an angle of approximately 270 degrees and the plane of the third face forming with each of the first two faces angles of approximately 90 degrees, an angular film gate support mounted on each of said first two faces for adjustment substantially perpendicular to said third face, each support having an aperture flange mounted on one of said two faces and an aperture plate extending to form substantially a right angle with the aperture plate of the other support, a light dividing prism mounted on said third face of said angle between said aperture plates with its component optical axes substantially perpendicular to said aperture plates, and adjusting means for rotating said prism about an axis parallel to one of said optical axes.

16. In a camera, a housing base plate, a unitary supporting block with a supporting base secured to said plate, a prism mounting surface and two gate supporting faces fronting said surface at angle to one another on said block, film gates mounted on said faces above the base and light dividing means mounted on said surface, said light dividing means directing light beams towards said film gates.

17. In a camera, a rigid unitary supporting block, a prism mounting surface on said block, two film gate support faces on said block extending at angles to each other and said surface and fronting said surface, film gates secured to said faces, and light dividing means mounted on said surface, said light dividing means directing light beams toward said film gates, and means on the block to feed film through said gates.

18. In a camera, a housing base plate, a unitary supporting block with a supporting base secured to said plate, a prism mounting surface and two gate supporting faces fronting the said surface at substantially right angles to one another on said block, film gates mounted on said faces above the base, and light dividing means mounted on said surface, said light dividing means directing light beams towards said gates.

19. In a camera, a rigid unitary supporting block, a prism mounting surface on said block, two film gate support faces on said block extending at substantially right angles to each other and said surface and fronting said surface, film gates secured to said faces and light dividing means mounted on said surface at the side of said faces, said light dividing means directing light beams toward said film gates and means on the block to feed film through said gates.

20. In a camera, a rigid unitary supporting block, a prism mounting surface on said block, two film gate support faces on said block extending at angles to each other and said surface and fronting said surface, film gates secured to said faces, light dividing means mounted on said surface directing light beams toward said film gates, and means for adjusting said film gates in planes parallel to said faces.

21. In a camera, a housing base plate, a unitary supporting block with a supporting base secured to said plate, a prism mounting surface and two gate supporting faces fronting said surface at angles to one another on said block, film gates mounted on said faces above said base, light dividing means mounted on said surface for directing light beams towards said gates, means for adjusting said film gates relatively to said surface, and clamping means directly connecting said film gates, securing their relative position.

22. A camera comprising a base plate, power distribution means mounted thereon, a front wall carrying a shutter and a lens system, a supporting block carrying film movements, and a rear wall carrying film feed and take-up means, said distribution means, said front wall, said block, and said rear wall being mounted on said base plate, a top removably carrying a film supply and take-up magazine, and doors forming part of the side walls of said camera.

23. A motion picture camera of the character described comprising an apparatus housing, a film reel container on said housing, an opening connecting said housing and said container, means for rotatably mounting two film reels within said container at a distance substantially smaller than the width of a film strip, a single means for driving said reels, and within said housing two coaxial sprocket means at the distance of said reels and two film gates, said reels supplying two films through said opening to said sprockets which transport them to said film gates.

24. A camera comprising a housing, a lens system support swingingly connected to said housing, a block supporting film gates and a light splitting device, said block being mounted on said housing, separate spacing means on said support system and separate spacing means on said supporting block cooperating with said first spacing means.

25. A camera comprising a housing, a lens system on a door hinged to said housing, a block supporting film gates, said block being mounted on said housing, a boss on said lens system and a corresponding boss on said supporting block, and means for positively contacting said bosses when the door is in closed position.

26. A motion picture camera comprising a housing, a central supporting block mounted on said housing, a light dividing system adjustably mounted on said block, film movements and a common drive therefor also mounted on said block, a lens system movably mounted on said housing, and means associated with said block and said lens system for spacing said system and the elements mounted upon said block independently of said housing.

27. A motion picture camera comprising a housing, a central supporting block mounted on said housing, a light dividing system and two film movements adjustably mounted on said block, a common gear drive for said movements permitting adjustment thereof mounted on said block, a lens system hinged to said housing, spacing means on said lens system and spacing means whereby said lens system, said film movements and said drive are correlated by means of said block, independently of other parts of the camera.

28. A photographic camera comprising an apparatus housing, a lens system support movably mounted on said housing, a film gate supporting block fixed to said housing back of said support, a stop on said block, and means on said support to engage said stop and exactly and directly to space the lens system and the film gate independently of said housing.

29. A camera comprising an apparatus housing, a lens system, a support for said system swingingly connected to said housing, a supporting block mounted on said housing, two film gates fixed to said block, a light splitting system secured to said block for directing components of light impending from said lens system towards said film gates, and means for directly contacting said support and said block exactly and directly to space said lens system and said block independently of said housing.

JOSEPH A. BALL.
GERALD F. RACKETT.